US006637208B2

(12) United States Patent
Horner

(10) Patent No.: US 6,637,208 B2
(45) Date of Patent: Oct. 28, 2003

(54) GAS TURBINE IN-LINE FRONT FRAME STRUT

(75) Inventor: Michael W. Horner, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/146,196

(22) Filed: May 15, 2002

(65) Prior Publication Data

US 2003/0029158 A1 Feb. 13, 2003

Related U.S. Application Data

(62) Division of application No. 08/955,799, filed on Oct. 22, 1997, now Pat. No. 6,430,931.

(51) Int. Cl.[7] .............................. F02C 6/08; F02C 7/143
(52) U.S. Cl. ............................. 60/785; 60/728; 60/806; 415/115; 416/95
(58) Field of Search .......................... 60/782, 785, 806, 60/767, 768, 726, 728; 415/115; 416/95, 96 A

(56) References Cited

U.S. PATENT DOCUMENTS

| | | | | |
|---|---|---|---|---|
| 1,777,782 A | * | 10/1930 | Bundy ........................ | 406/191 |
| 3,011,762 A | * | 12/1961 | Pouit ......................... | 415/115 |
| 3,355,883 A | * | 12/1967 | Beam, Jr. ................... | 60/806 |
| 3,751,909 A | * | 8/1973 | Kohler ....................... | 60/726 |
| 3,860,064 A | * | 1/1975 | Murphy ...................... | 416/3 |
| 4,137,705 A | * | 2/1979 | Andersen et al. ............ | 60/806 |
| 4,515,523 A | * | 5/1985 | North et al. ................ | 415/115 |
| 4,550,562 A | * | 11/1985 | Rice .......................... | 60/772 |
| 4,660,376 A | * | 4/1987 | Johnson ...................... | 60/775 |
| 4,914,904 A | * | 4/1990 | Parnes et al. ............... | 60/226.1 |
| 5,193,975 A | * | 3/1993 | Bird et al. .................. | 415/115 |
| 5,317,877 A | * | 6/1994 | Stuart ........................ | 60/806 |

(List continued on next page.)

*Primary Examiner*—Ted Kim
(74) *Attorney, Agent, or Firm*—William Scott Andes; Armstrong Teasdale LLP; Robert B. Reeser, III

(57) ABSTRACT

A gas turbine engine including in-line intercooling wherein compressor intercooling is achieved without removing the compressor main flow airstream from the compressor flowpath is described. In an exemplary embodiment, a gas turbine engine suitable for use in connection with in-line intercooling includes a low pressure compressor, a high pressure compressor, and a combustor. The engine also includes a high pressure turbine, a low pressure turbine, and a power turbine. For intercooling, fins are located in an exterior surface of the compressor struts in the compressor flowpath between the outlet of the low pressure compressor and the inlet of the high pressure compressor. Coolant flowpaths are provided in the compressor struts, and such flowpaths are in flow communication with a heat exchanger. In operation, air flows through the low pressure compressor, and compressed air is supplied from the low pressure compressor to the high pressure compressor. The fins increase the heat transfer area between the gas turbine main compressor airflow and the coolant flow in the struts. Specifically, the flowpaths in the struts serve as heat sinks for cooling the high temperature compressor mainstream flow. The cooled airflow is supplied to the inlet of the high pressure compressor, and the highly compressed air is delivered to the combustor. Airflow from the combustor drives the high pressure turbine, the low pressure turbine, and the power turbine. Waste heat is captured by the boilers, and the heat from the boilers in the form of steam is delivered to upstream components. The steam could, alternatively, be delivered to a steam turbine or to other equipment.

7 Claims, 6 Drawing Sheets

U.S. PATENT DOCUMENTS

| | | | | |
|---|---|---|---|---|
| 5,351,473 A | * | 10/1994 | Shuba | 60/782 |
| 5,393,198 A | * | 2/1995 | Noda et al. | 415/115 |
| 5,488,825 A | * | 2/1996 | Davis et al. | 60/806 |
| 5,522,356 A | * | 6/1996 | Palmer | 60/39.55 |
| 5,669,217 A | * | 9/1997 | Anderson | 60/775 |
| 5,711,650 A | * | 1/1998 | Tibbott et al. | 415/115 |
| 5,722,241 A | * | 3/1998 | Huber | 60/728 |
| 5,845,482 A | * | 12/1998 | Carscallen | 60/785 |

* cited by examiner

GAS TURBINE IN-LINE FRONT FRAME STRUT

This application is a divisional of Ser. No. 08/955,799, now U S. Pat. No. 6,430,931 filed Oct. 22, 1997, which is hereby incorporated by reference.

FIELD OF THE INVENTION

This invention relates generally to gas turbine engines and more particularly, to an in-line intercooler which eliminates removing the compressor main flow airstream from the compressor flowpath.

BACKGROUND OF THE INVENTION

Gas turbine engines typically include a compressor for compressing a working fluid, such as air. The compressed air is injected into a combustor which heats the fluid, and the fluid is then expanded through a turbine. The compressor typically includes a low pressure compressor and a high pressure compressor.

The output of known gas turbine engines may be limited by the temperature of the working fluid at the output of the high pressure compressor, sometimes referred to as "T3", and by the temperature of the working fluid in the combustor outlet, sometimes referred to as "T41". To provide increased power output and cycle thermal efficiency without exceeding the T3 and T41 temperature limits, it is known to use an intercooler positioned in the fluid flow path between the low pressure compressor and the high pressure compressor.

Known intercoolers generally require the extraction and reintroduction of the entire gas turbine mainstream flow from and into the main gas turbine flowpath. Requiring that the entire gas turbine mainstream flow be extracted and reintroduced into the mainstream flow reduces the thermal efficiency of the cycle and adds component costs to an engine. Such intercoolers also introduce pressure losses associated with the removal of air, the actual cooling of that air, and ducting it back to the compressor. In addition, and in order to accommodate the entire mainstream flow, known intercoolers typically must have a large capacity. A significant amount of water is required by such high capacity intercoolers, and such high water consumption increases the operational costs. Of course, a larger capacity intercooler is more expensive, both to fabricate and operate, than a typical smaller capacity intercooler. Also, It would be desirable to provide intercooling yet eliminate the requirement that the entire mainstream flow be extracted and reintroduced into the main gas turbine flow. It also would be desirable to reduce the required capacity for an intercooler yet provide substantially the same operational results.

SUMMARY OF THE INVENTION

These and other objects may be attained by a gas turbine engine including in-line intercooling wherein compressor intercooling is achieved without removing the compressor main flow airstream from the compressor flowpath. In an exemplary embodiment, a gas turbine engine suitable for use in connection with in-line intercooling includes a low pressure compressor, a high pressure compressor, and a combustor. The engine also includes a high pressure turbine, a low pressure turbine, and a power turbine.

For intercooling, fins are located in an exterior surface of the compressor struts in the compressor flowpath between the outlet of the low pressure compressor and the inlet of the high pressure compressor. Coolant flowpaths are provided in the compressor struts, and such flowpaths are in flow communication with a heat exchanger.

In operation, air flows through the low pressure compressor, and compressed air is supplied from the low pressure compressor to the high pressure compressor. The fins increase the heat transfer area between the gas turbine main compressor airflow and the coolant flow in the struts. Specifically, the flowpaths in the struts serve as heat sinks for cooling the high temperature compressor mainstream flow. The cooled airflow is supplied to the inlet of the high pressure compressor, and the highly compressed air is delivered to the combustor. Airflow from the combustor drives the high pressure turbine, the low pressure turbine, and the power turbine. Waste heat is captured by the boilers, and the heat from the boilers in the form of steam is delivered to upstream components.

The in-line intercooling provides an advantage in that the temperature of the airflow at the outlet of the high pressure compressor (temperature T3) and the temperature of the airflow at the outlet of the combustor (temperature T41) are reduced as compared to such temperatures without intercooling. Specifically, the combination of the fins and coolant flow through the struts extract heat from the hot air flowing into and through the high pressure compressor, and by extracting such heat from the air flow, the T3 and T41 temperatures are reduced and compressive horsepower is reduced. Reducing the T3 and T41 temperatures provides the advantage that the engine is not T3 and T41 constrained, and therefore, the engine may operate at higher output levels than is possible without intercooling.

DETAILED DESCRIPTION

Set forth below are exemplary configurations of in-line intercooling in accordance with various embodiments of the present invention. Initially, it should be understood that although specific implementations are illustrated and described, in-line intercooling can be practiced using many alternative structures and in a wide variety of engines. In addition, and as described below in more detail, in-line intercooling can be performed at various locations in the engine, and is not limited to practice at an intermediate location between the low pressure compressor and the high pressure compressor as described below.

Figure 1:
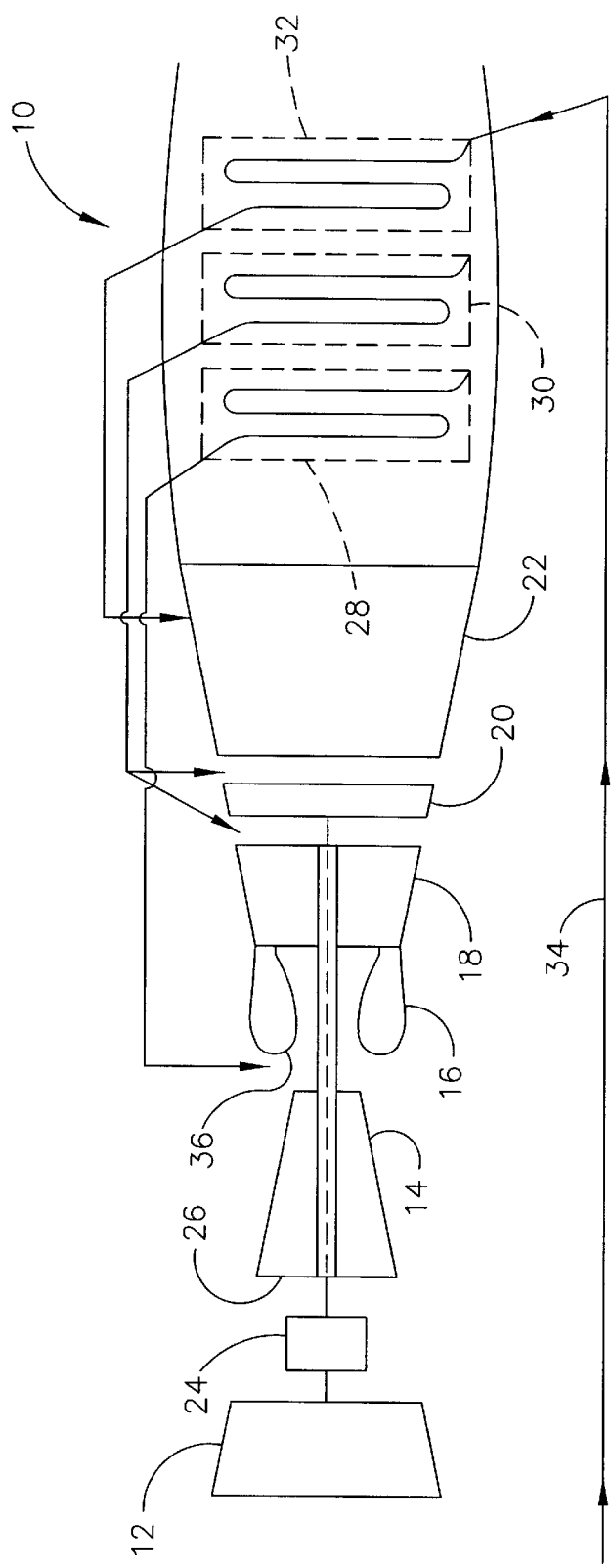
FIG. 1 is a schematic illustration of a gas turbine engine including inline intercooling in accordance with one embodiment of the present invention.

Referring now specifically to the drawings, FIG. 1 is a schematic illustration of a gas turbine engine 10 which, as is well known, includes a low pressure compressor 12, a high pressure compressor 14, and a combustor 16. Engine 10 also includes a high pressure turbine 18, a low pressure turbine 20, and a power turbine 22.

In-line intercooling apparatus 24 is provided for cooling the airflow from the low pressure compressor to an inlet of high pressure compressor 14. Further details regarding various embodiments of apparatus 24 are set forth below. For purposes of FIG. 1, however, it should be understood that apparatus 24 is in-line with high pressure compressor 14 in that the airflow to compressor 14 need not be extracted and reintroduced into the main gas flow.

Waste heat boilers 28, 30, and 32 are located downstream of power turbine 22. As is known in the art, feed water is supplied to boilers 28, 30, and 32 via a feedwater line 34, and water in the form of steam is communicated from boilers 28, 30, and 32 to various upstream components. Particularly, steam from boiler 28 is provided to an inlet 36 of combustor 16, steam from boiler 30 is provided to an inlet of low pressure turbine 20 and an inlet of power turbine 22, and steam from boiler 32 is provided to a last stage of power turbine 22. Except for in-line injection apparatus 24, the various components of turbine 10 are known in the art.

In operation, air flows through low pressure compressor 12, and compressed air is supplied from low pressure compressor 12 to high pressure compressor 14. In-line intercooling apparatus 24 cools the air flow supplied to high pressure compressor 14, and the air is further compressed by high pressure compressor 14. The highly compressed air is delivered to combustor 16. Airflow from combustor 16 drives high pressure turbine 18, low pressure turbine 20, and power turbine 22. Waste heat is captured by boilers 28, 30, and 32, and the waste heat steam is delivered to upstream components coupled to boilers 28, 30 and 32 as described above.

In-line intercooling apparatus 24 provides the advantage that the airflow to high pressure compressor need not be extracted and reintroduced into the main airflow for intercooling. Rather, with apparatus 24, intercooling is provided within the main airflow. Therefore, the thermal efficiency of engine 10 is believed to be improved, and pressure losses are believed to be less, as compared to an engine using a known intercooler. Further, less coolant is believed to be used in connection with apparatus 24 than in known large capacity intercoolers.

Figure 2:
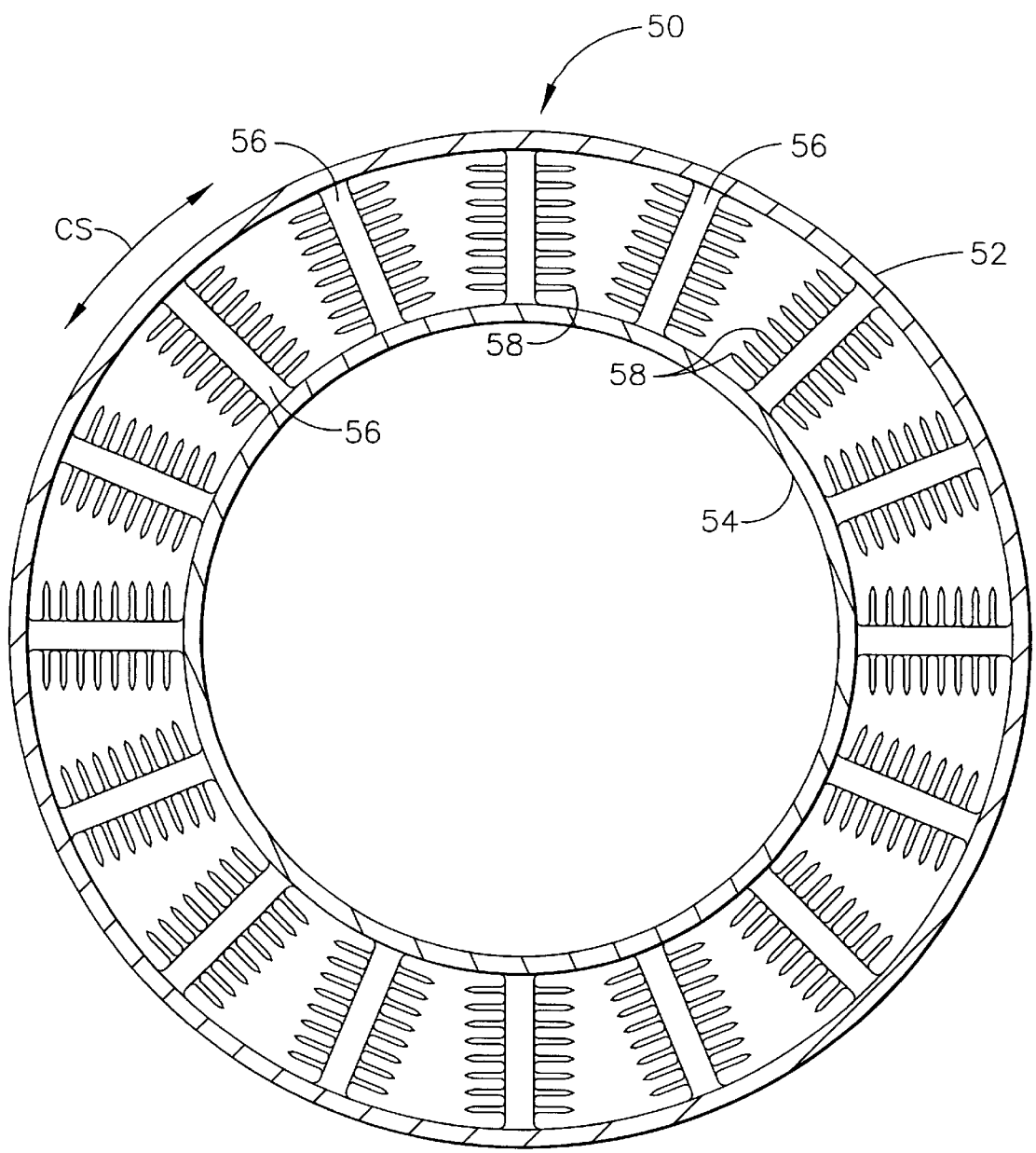
FIG. 2 is a cross section through a portion of the front frame structure for the high pressure compressor shown in FIG. 1.

FIG. 2 is a cross section through a portion of a front frame 50 for high pressure compressor 26 and illustrating various aspects of in-line intercooling apparatus 24. Specifically, frame 50 includes an outer shell 52 and an inner shell 54, and a plurality of struts 56 extend from and between outer and inner shells 52 and 54. Shells 52 and 54 are substantially cylindrical, and the main airflow through engine 10 is between shells 52 and 54.

In accordance with the present invention, struts 56 include a plurality of fins 58. Struts 56 and fins 58 are shown schematically in FIG. 2. Fins 58 extend from the exterior surface of struts 56 and increase the heat transfer area between the gas turbine main compressor airflow and, as described below, coolant flowing through struts 56.

To enhance intercooling, front frame (including struts) 50 may be fabricated from a high thermal conductivity material, such as aluminum or an aluminum alloy. Such material is believed to provide a very high heat transfer effectiveness for struts 56 and fins 58.

Figure 3:
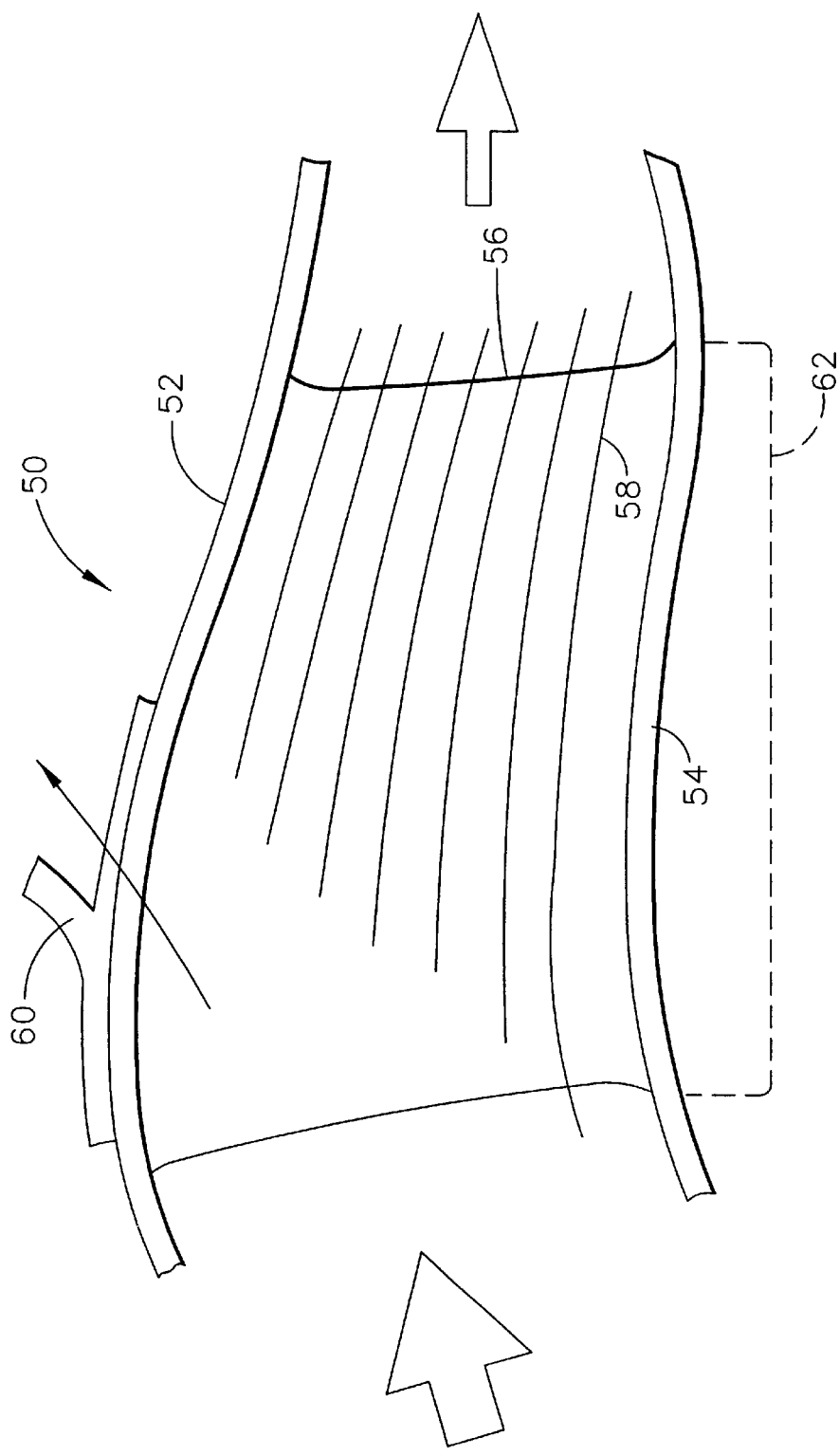
FIG. 3 illustrates air flow by one of the struts shown schematically in FIG. 2.

FIG. 3 illustrates air flow by one strut 56. As shown in FIG. 3, a bleed door or perforated plate 60 is located on outer shell 56 and allows air to bleed from between inner and outer shells 52 and 54. Such bleed flow often is required in the operation of a two-shaft aeroderivative gas generator. Further, an inboard coolant manifold 62 may be secured to strut 56. Such manifold 62 would, of course, be connected in a coolant return circuit directing the flow to a heat exchanger.

Figure 4:
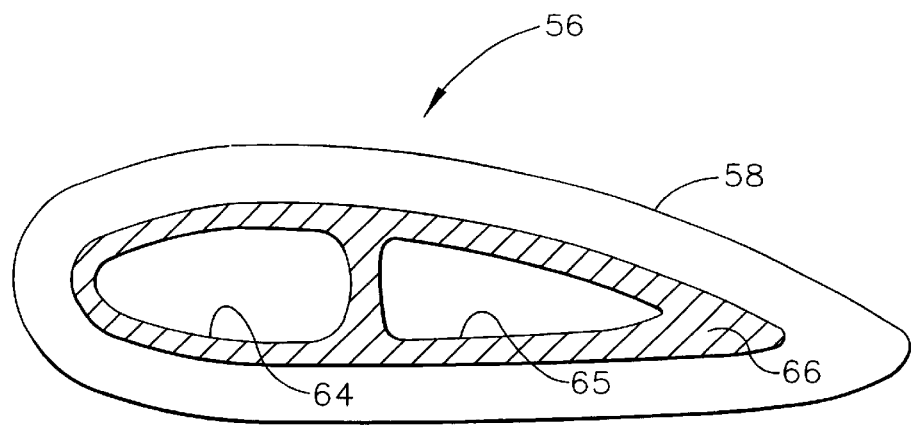
FIG. 4 is a cross sectional view through the strut shown in FIG. 3.

FIG. 4 is a cross sectional view through strut 56 shown in FIG. 3. Strut 56 includes fins (only one fin is visible in FIG. 4) 58 and an inner coolant passage 64 in strut main body 66 which operates as a heat sink for the high temperature compressor mainstream flow. More particularly, coolant is supplied to passage 64, and as such coolant is heated, such heated coolant is replaced by cooled coolant. Heat is removed from the coolant by the heat exchanger. Alternatively, the coolant can be discharged or to a second heat exchange fluid (e.g., air, fuel, or water). As a result of such heat transfer, heat is extracted from the main airflow prior to entering high pressure compressor 14 (FIG. 1).

Figure 5:
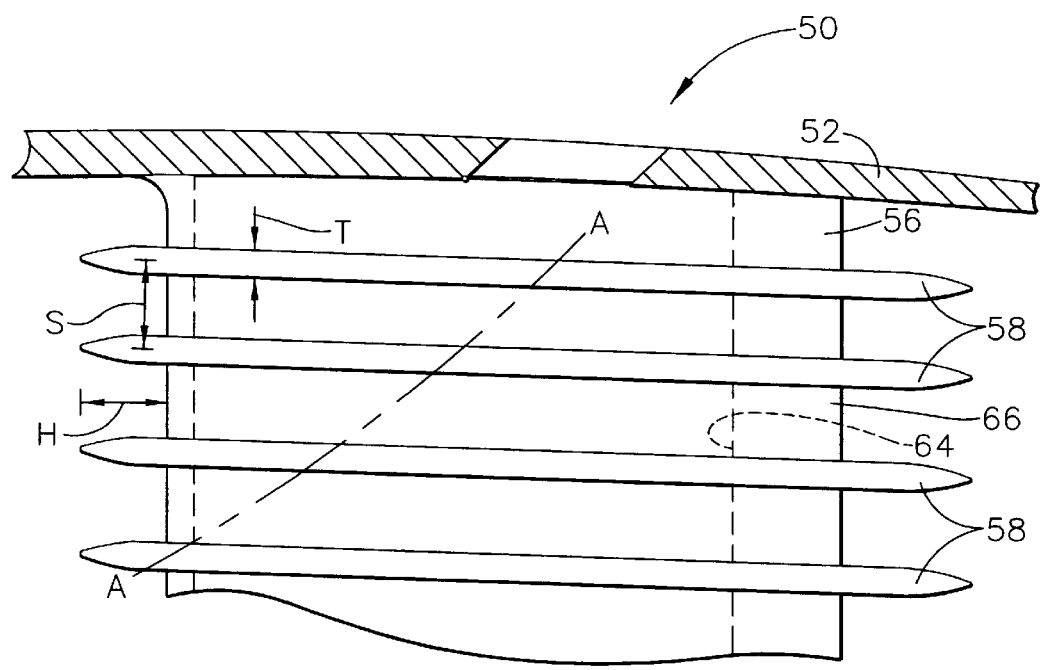
FIG. 5 is a side view of a portion of the strut shown in FIG. 3.

FIG. 5 is a side view of a portion of strut 56. Line A—A shown in FIG. 3 generally indicates the location at which fins 58 may need to be terminated if compressor bleed flow is required. Such termination of fins 58 would permit unobstructed flow to bleed doors or passages. In addition, parameters such as fin spacing S, fin thickness T, fin height H, the fin profile shape, and circumferential fin spacing CS (FIG. 2) are selected to balance operating and manufacturing considerations such as the heat transfer rate to achieve the desired level of cooling of mainstream air, ease of manufacture, manufacturing cost, durability, and achieving an acceptable level of mainstream pressure loss.

Figure 6A:
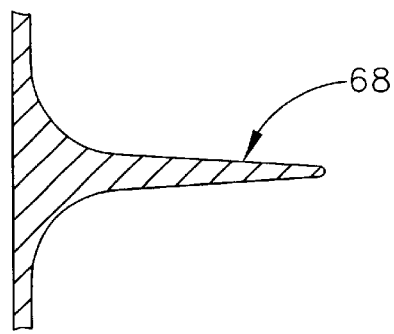
FIGS. 6a, 6b, 6c, and 6d illustrate alternative embodiments of the shapes of the strut fins shown in FIG. 5.
Figure 6B:
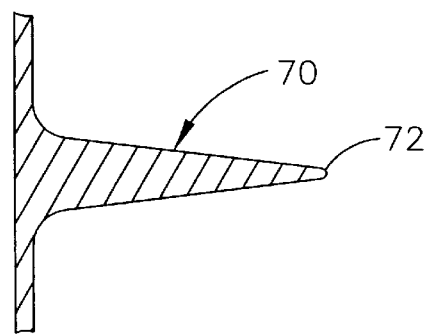
Figure 6C:
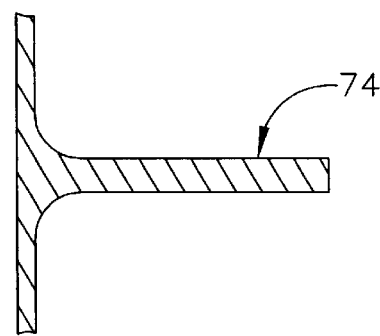
Figure 6D:
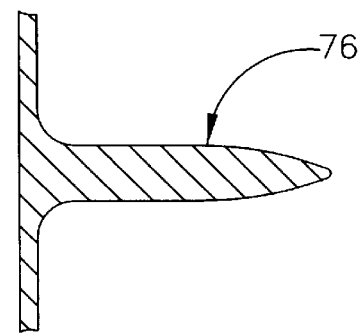

With respect to a geometric shape of fins, FIGS. 6a, 6b, 6c, and 6d illustrate alternative embodiments. An ideal fin shape 68 is shown in FIG. 6a. Such a fin shape is believed to provide preferred results for aerodynamic considerations and heat transfer. Such a fin shape may, however, be difficult to manufacture. FIG. 6b illustrates a triangular shaped fin 70 with a rounded edge 72, FIG. 6c illustrates a rectangular shaped fin 74, and FIG. 6d illustrates a bullet shaped fin 76. These fin shapes are believed to at least merit consideration when selecting a fin shape for a specific application.

Rather than being separate, it is contemplated that the fins could be connected between adjacent struts. With such a configuration, continuous rings would be located around the front frame annulus. Of course, many other variations of the fins are possible.

Figure 7:
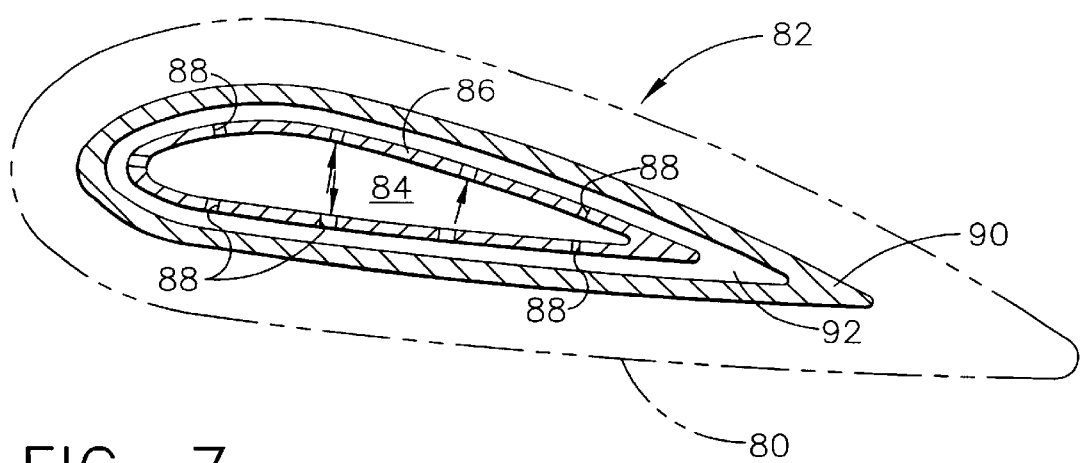
FIG. 7 is a cross sectional view through a strut in accordance with another embodiment of the present invention.
Figure 8:
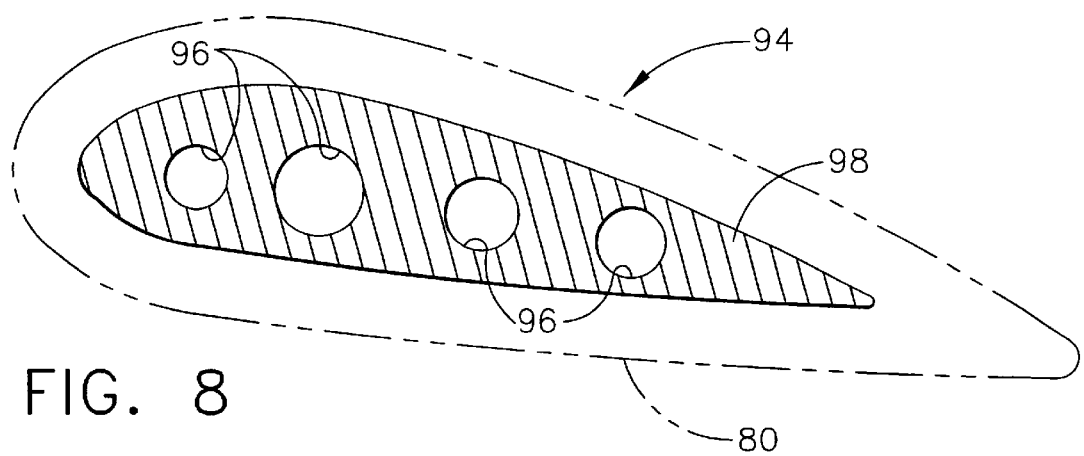
FIG. 8 is a cross sectional view through a strut in accordance with yet another embodiment of the present invention.
Figure 9:
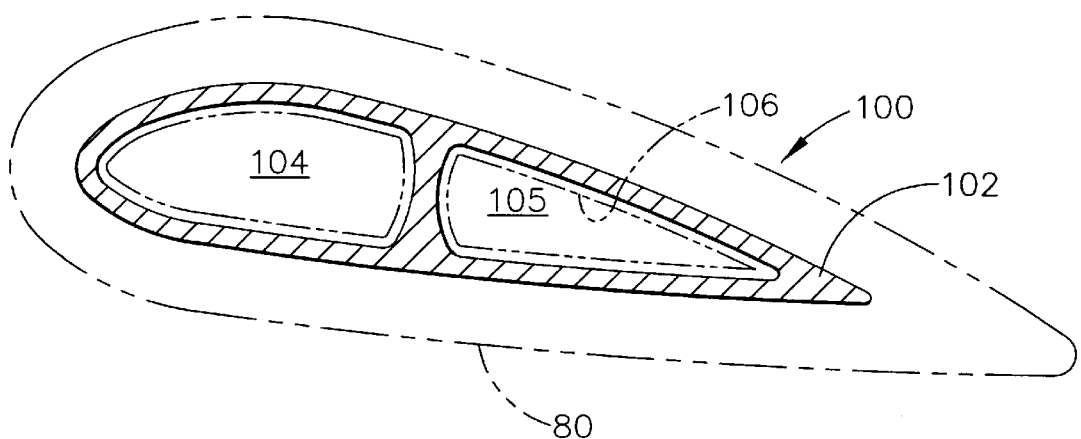
FIG. 9 is a cross sectional view through a strut in accordance with still yet another embodiment of the present invention.

In addition, and referring to FIGS. 7, 8, and 9, alternative configurations of struts also are possible. Fins 80 are illustrated in phantom in FIGS. 7, 8, and 9. For example, FIG. 7 is a cross sectional view through a strut 82 in accordance with another embodiment of the present invention. Strut 82 includes an inner passage 84 formed by an inner member 86 which may include impingement holes 88 therethrough. An outer member 90 surrounds inner member, and coolant (e.g., liquid or gas) flows through inner member 86 and through impingement holes 88 to a space 92 between inner and outer members 86 and 90.

Another strut 94 is shown in FIG. 8. Particularly, radial openings 96 are formed in a strut train body 98. Coolant flows through such radial openings 96 for transferring heat from the main airflow through the engine to the coolant.

In FIG. 9, a strut 100 includes a main body 102 having an inner coolant passage 104 and 105 with turbulator ribs 106 formed on their interior surfaces. Such ribs 106 increase the heat transfer area between strut 100 and coolant flowing through passages 104 and 105.

Intercooling provided by the above described in-line intercooling apparatus extracts heat from the air compressed in the low pressure compressor, which reduces both the temperature and volume of air entering the high pressure compressor. Such reduction in temperature reduces both the T3 and T41 temperatures while reducing compressor required horsepower, and greater output can be achieved. Such intercooling also provides the advantage that the airflow to high pressure compressor need not be extracted and reintroduced into the main airflow for intercooling. Rather, with the in-line apparatus, intercooling is provided within the main airflow. Therefore, the thermal efficiency of the engine is believed to be improved, and pressure losses are believed to be less, as compared to an engine using a known intercooler. Further, less coolant is believed to be used in connection with in-line apparatus than in known large capacity intercoolers.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A high pressure compressor front frame of a gas turbine engine having a longitudinal axis, said frame comprising:

a plurality of struts therein, each of said struts comprising a main body having a coolant flow passage therethrough;

a plurality of fins extending from an external surface of said main body, each said fin comprising an upstream end; and at least one opening defined in a peripheral portion of said frame for channeling bleed flow therethrough, at least some of said fin upstream ends being positioned in different axial locations to facilitate enhanced bleed flow to said opening.

2. A high pressure compressor front frame in accordance with claim 1 wherein said coolant flow passage is an inner passage formed by an inner member positioned within an outer member.

3. A high pressure compressor front frame in accordance with claim 2 wherein said inner member has a plurality of impingement holes therethrough.

4. A high pressure compressor front frame in accordance with claim 3 wherein coolant may flow through said inner member impingement holes and into a space between inner and outer members.

5. A high pressure compressor front frame in accordance with claim 1 wherein said coolant flow passage is formed by a plurality of radial openings in said strut.

6. A high pressure compressor front frame in accordance with claim 1 wherein said coolant flow passage is a hollow cavity extending at least partially through said strut.

7. A high pressure compressor front frame in accordance with claim 6 wherein a plurality of turbulators are positioned on an interior surface of said hollow cavity.

* * * * *